(12) United States Patent
Mandare et al.

(10) Patent No.: US 8,173,232 B2
(45) Date of Patent: May 8, 2012

(54) STRETCH HOOD FILMS

(75) Inventors: Prashant Mandare, Lake Jackson, TX (US); Gregory Bunker, Lake Jackson, TX (US); Rajen M. Patel, Lake Jackson, TX (US); Yi Jin, Lake Jackson, TX (US); Selim Bensason, Au (CH); Mehmet Demirors, Pearland, TX (US); Theresa J. Hermel-Davidock, Randolph, NJ (US); Sarah M. Hayne, Houston, TX (US); Jose E. Ruiz, Sugar Land, TX (US)

(73) Assignee: Dow Global Technologies LLC, Midland, MI (US)

( * ) Notice: Subject to any disclaimer, the term of this patent is extended or adjusted under 35 U.S.C. 154(b) by 140 days.

(21) Appl. No.: 12/781,247

(22) Filed: May 17, 2010

(65) Prior Publication Data
US 2011/0003129 A1    Jan. 6, 2011

Related U.S. Application Data

(60) Provisional application No. 61/222,371, filed on Jul. 1, 2009.

(51) Int. Cl.
B29D 22/00    (2006.01)
B29D 23/00    (2006.01)
B32B 1/08     (2006.01)

(52) U.S. Cl. ....... 428/35.7; 428/500; 428/332; 428/337; 428/339

(58) Field of Classification Search ............. 428/35.7, 428/500, 332, 337, 339
See application file for complete search history.

(56) References Cited

U.S. PATENT DOCUMENTS

| | | | |
|---|---|---|---|
| 5,844,045 A | 12/1998 | Kolthammer et al. | |
| 5,869,575 A | 2/1999 | Kolthammer et al. | |
| 6,448,341 B1 | 9/2002 | Kolthammer et al. | |
| 6,538,070 B1 | 3/2003 | Cardwell et al. | |
| 6,545,088 B1 | 4/2003 | Kolthammer et al. | |
| 6,566,446 B1 | 5/2003 | Parikh et al. | |
| 7,411,026 B2 | 8/2008 | Ohlsson et al. | |
| 7,632,573 B2 * | 12/2009 | Ohlsson et al. | 428/522 |
| 2005/0037219 A1 | 2/2005 | Ohlsson et al. | |
| 2008/0106005 A1 | 5/2008 | Fiscus et al. | |
| 2008/0226920 A1 | 9/2008 | Parkinson et al. | |

FOREIGN PATENT DOCUMENTS

| | | |
|---|---|---|
| EP | 1854841 A1 | 11/2007 |
| WO | WO-2006/023566 A1 | 3/2006 |
| WO | WO-2006/036347 A1 | 4/2006 |
| WO | WO-2006/049674 A1 | 5/2006 |
| WO | WO-2007129078 A1 | 11/2007 |

OTHER PUBLICATIONS

Balke, Mourey, et al., *Chromatography Polym.*, Chapter 12, 1992.
Balke, Mourey, et. Al., *Chromatography Polym.*,(1992) Chapter 13.
Zimm, B.H., Journal of Chemical Phys., 16, (1948) 1099.
Kratochvil, Classical Light Scattering from Polymer Solutions, (1987) Elsevier, Oxford, NY.
Yau, Wallace, "Examples of Using 3D-GPC-TREF for Polyofin Characterization", Macromol. Symp., 2007, 257, 29-45.
B. Monrabal et al, Crystallization Elution Fractionation (CEF) (PolymerChar in Spain), Macromol. Symp. 25771-79 (2007).
PCT/US2011/036788, Internationl Search Report/Written Opinion.

* cited by examiner

*Primary Examiner* — Michael C Miggins

(57) ABSTRACT

A multi-layer film structure is made from a specific polyethylene copolymer comprising the inner layer and is useful as a stretch hood film structure. The polyethylene copolymer can be characterized by a Comonomer Distribution Constant greater than about 45.

9 Claims, 3 Drawing Sheets

STRETCH HOOD FILMS

CROSS-REFERENCE TO RELATED APPLICATIONS

This application claims priority from U.S. provisional patent application Ser. No. 61/222,371, filed Jul. 1, 2009, the disclosure of which is incorporated herein by reference for purposes of U.S. practice.

BACKGROUND OF THE INVENTION

There have been many varieties of polyethylene polymers polymerized over the years, including those made using high pressure free radical chemistry (LDPE), more traditional linear low density polyethylene (LLDPE) typically made using Ziegler-Natta catalysis and metallocene or constrained geometry catalyzed polyethylene—some linear polyethylenes, but also some substantially linear polyethylene containing a slight amount of long chain branching. While these polymers have varying positives and negatives—depending on application or end-use—more control over the polymer structure is still desired.

We have now found that post-metallocene catalysts can efficiently polymerize ethylene into polymers and polymer compositions having controlled comonomer distribution profiles, while also controlling unsaturation levels in the polymer and that multi-layer films comprising such new polymers, especially when the new polymer comprises an inner layer, are useful as stretch hood films. Stretch hood films are useful in unitizing pallets of goods for shipment and transport.

BRIEF SUMMARY OF THE INVENTION

In one embodiment, the invention is a multi-layer film having a thickness of at least 3 mils comprising at least one inner layer and two exterior layers, wherein the inner layer comprises at least 50 weight percent polyethylene copolymer having a melt index less than 2 grams/10 minutes, a density less than or equal to 0.910 g/cm$^3$, an overall heat of fusion less than 120 Joules/gram and a heat of fusion above 115° C. of less than 5 Joules/gram, and a total heat of fusion of the inner layer less than a heat of fusion of either of the two exterior layers, and wherein the multi-layer film has an elastic recovery of at least 40% when stretched to 100% elongation.

Preferably, the exterior layers are less than 50 weight percent of the total film.

Also preferably, the film has 3 layers and is made using a blown film process.

A stretch hood film structure formed from the multi-layer film is especially useful.

The polyethylene copolymer in the inner layer can have a Mw/Mn of at least 2.5.

The polyethylene copolymer of the inner layer can also be characterized as having a Comonomer Distribution Constant greater than about 45 and as high as 400, and wherein the polyethylene copolymer has less than 120 total unsaturation unit/1,000,000 C, preferably also less than 20 vinylidene unsaturation unit/1,000,000 C.

The polyethylene copolymer of the inner layer can also be characterized by having up to about 3 long chain branches/1000 carbons.

The polyethylene copolymer of the inner layer can also comprise a single DSC melting peak.

CDC is defined as Comonomer Distribution Index divided by Comonomer Distribution Shape Factor multiplying by 100 (Equation 1).

$$CDC = \frac{\text{Comonomer Distribution Index}}{\text{Comonomer Distribution Shape Factor}} \quad \text{Equation 1}$$
$$= \frac{\text{Comonomer Distribution Index}}{\text{Half Width}/Stdev} * 100$$

Comonomer distribution index stands for the total weight fraction of polymer chains with the comonomer content ranging from 0.5 of median comonomer content ($C_{median}$) and 1.5 of $C_{median}$ from 35.0 to 119.0° C. Comonomer Distribution Shape Factor is defined as a ratio of the width at half peak height (HalfWidth) of comonomer distribution profile divided by the standard deviation (Stdev) of comonomer distribution profile from the peak temperature ($T_p$).

DETAILED DESCRIPTION OF THE INVENTION

In some processes, processing aids, such as plasticizers, can also be included in the ethylenic polymer product. These aids include, but are not limited to, the phthalates, such as dioctyl phthalate and diisobutyl phthalate, natural oils such as lanolin, and paraffin, naphthenic and aromatic oils obtained from petroleum refining, and liquid resins from rosin or petroleum feedstocks. Exemplary classes of oils useful as processing aids include white mineral oil such as KAYDOL oil (Chemtura Corp.; Middlebury, Conn.) and SHELLFLEX 371 naphthenic oil (Shell Lubricants; Houston, Tex.). Another suitable oil is TUFFLO oil (Lyondell Lubricants; Houston, Tex).

In some processes, ethylenic polymers are treated with one or more stabilizers, for example, antioxidants, such as IRGANOX 1010 and IRGAFOS 168 (Ciba Specialty Chemicals; Glattbrugg, Switzerland). In general, polymers are treated with one or more stabilizers before an extrusion or other melt processes. In other embodiment processes, other polymeric additives include, but are not limited to, ultraviolet light absorbers, antistatic agents, pigments, dyes, nucleating agents, fillers, slip agents, fire retardants, plasticizers, processing aids, lubricants, stabilizers, smoke inhibitors, viscosity control agents and anti-blocking agents. The ethylenic polymer composition may, for example, comprise less than 10 percent by the combined weight of one or more additives, based on the weight of the embodiment ethylenic polymer. A particular benefit of the claimed polymers is the absence of catalyst kill agents, other than water, thus eliminating the need for calcium stearate.

The ethylenic polymer produced may further be compounded. In some ethylenic polymer compositions, one or more antioxidants may further be compounded into the polymer and the compounded polymer pelletized. The compounded ethylenic polymer may contain any amount of one or more antioxidants. For example, the compounded ethylenic polymer may comprise from about 200 to about 600 parts of one or more phenolic antioxidants per one million parts of the polymer. In addition, the compounded ethylenic polymer may comprise from about 800 to about 1200 parts of a phosphite-based antioxidant per one million parts of polymer. The compounded disclosed ethylenic polymer may further comprise from about 300 to about 1250 parts of calcium stearate per one million parts of polymer.

Uses

The ethylenic polymer may be employed in a variety of conventional thermoplastic fabrication processes to produce useful articles, including objects comprising at least one film layer, such as a monolayer film, or at least one layer in a multilayer film prepared by cast, blown, calendared, or extrusion coating processes; molded articles, such as blow molded, injection molded, or rotomolded articles; extrusions; fibers; and woven or non-woven fabrics. Multi-layer films, preferably 3 layer films, are useful in the invention, especially where the multi-layer film can be used in a stretch hood application. Thermoplastic compositions comprising the ethylenic polymer include blends with other natural or synthetic materials, polymers, additives, reinforcing agents, ignition resistant additives, antioxidants, stabilizers, colorants, extenders, crosslinkers, blowing agents, and plasticizers.

Additives and adjuvants may be added to the ethylenic polymer post-formation. Suitable additives include fillers, such as organic or inorganic particles, including clays, talc, titanium dioxide, zeolites, powdered metals, organic or inorganic fibers, including carbon fibers, silicon nitride fibers, steel wire or mesh, and nylon or polyester cording, nano-sized particles, clays, and so forth; tackifiers, oil extenders, including paraffinic or napthelenic oils; and other natural and synthetic polymers, including other polymers that are or can be made according to the embodiment methods.

Blends and mixtures of the ethylenic polymer with other polyolefins may be performed. Suitable polymers for blending with the embodiment ethylenic polymer include thermoplastic and non-thermoplastic polymers including natural and synthetic polymers. Exemplary polymers for blending include polypropylene, (both impact modifying polypropylene, isotactic polypropylene, atactic polypropylene, and random ethylene/propylene copolymers), various types of polyethylene, including high pressure, free-radical LDPE, Ziegler-Natta LLDPE, metallocene PE, including multiple reactor PE ("in reactor" blends of Ziegler-Natta PE and metallocene PE, such as products disclosed in U.S. Pat. No. 6,545,088 (Kolthammer, et al.); U.S. Pat. No. 6,538,070 (Cardwell, et al.); U.S. Pat. No. 6,566,446 (Parikh, et al.); U.S. Pat. No. 5,844,045 (Kolthammer, et al.); U.S. Pat. No. 5,869,575 (Kolthammer, et al.); and U.S. Pat. No. 6,448,341 (Kolthammer, et al.)), ethylene-vinyl acetate (EVA), ethylene/vinyl alcohol copolymers, polystyrene, impact modified polystyrene, ABS, styrene/butadiene block copolymers and hydrogenated derivatives thereof (SBS and SEBS), and thermoplastic polyurethanes. Homogeneous polymers such as olefin plastomers and elastomers, ethylene and propylene-based copolymers (for example, polymers available under the trade designation VERSIFY™ Plastomers & Elastomers (The Dow Chemical Company), SURPASS™ (Nova Chemicals), and VISTAMAXX™ (ExxonMobil Chemical Co.)) can also be useful as components in blends comprising the ethylenic polymer.

The ethylenic polymer may be employed as a sealant resins. Surprisingly, certain short chain branching distribution (SCBD), as shown by CDC, in combination with certain MWD, and a certain level of long chain branching (LCB) has shown to improve hot tack and heat seal performance, including increased hot-tack & heat-seal strength, lower heat seal and hot tack initiation temperatures, and a broadening of the hot tack window. The ethylenic polymer maybe employed as a pipe and tubing resin through an optimization of the SCBD and MWD, with low unsaturation levels for improved ESCR (environmental stress crack resistance) and higher PENT (Pennsylvania Edge-Notch Tensile Test). The ethylenic polymer maybe be employed in applications where UV stability, weatherability are desired through an optimization of the SCBD and MWD, in combination with low unsaturation levels, and low levels of low molecular weight, high commoner incorporated oligomers. The ethylenic polymer maybe employed in applications where low levels of plate-out, blooming, die build-up, smoke formation, extractables, taste, and odor are desired through an optimization of the SCBD and MWD with low levels of low molecular weight, high comonomer incorporated oligomers. The ethylenic polymer maybe employed in stretch film applications. Surprisingly, certain SCBD, in combination with certain MWD, and a certain level of long chain branching (LCB) shows improved stretchability and dynamic puncture resistance.

DEFINITIONS

The term "composition," as used, includes a mixture of materials which comprise the composition, as well as reaction products and decomposition products formed from the materials of the composition.

The terms "blend" or "polymer blend," as used, mean an intimate physical mixture (that is, without reaction) of two or more polymers. A blend may or may not be miscible (not phase separated at molecular level). A blend may or may not be phase separated. A blend may or may not contain one or more domain configurations, as determined from transmission electron spectroscopy, light scattering, x-ray scattering, and other methods known in the art. The blend may be effected by physically mixing the two or more polymers on the macro level (for example, melt blending resins or compounding) or the micro level (for example, simultaneous forming within the same reactor).

The term "linear" refers to polymers where the polymer backbone of the polymer lacks measurable or demonstrable long chain branches, for example, the polymer can be substituted with an average of less than 0.01 long branch per 1000 carbons.

The term "polymer" refers to a polymeric compound prepared by polymerizing monomers, whether of the same or a different type. The generic term polymer thus embraces the term "homopolymer," usually employed to refer to polymers prepared from only one type of monomer, and the term "interpolymer" as defined. The terms "ethylene/α-olefin polymer" is indicative of interpolymers as described.

The term "interpolymer" refers to polymers prepared by the polymerization of at least two different types of monomers. The generic term interpolymer includes copolymers, usually employed to refer to polymers prepared from two different monomers, and polymers prepared from more than two different types of monomers. The term "polyethylene copolymer" refers to a polymer that contains more than 50 mole percent polymerized ethylene monomer (based on the total amount of polymerizable monomers) and, optionally, may contain at least one comonomer.

The term "ethylene/α-olefin interpolymer" refers to an interpolymer that contains more than 50 mole percent polymerized ethylene monomer (based on the total amount of polymerizable monomers) and at least one α-olefin.

The term "ethylenic polymer" refers to a polymer resulting from the intermolecular bonding of a crystalline ethylene-based polymer and at least one highly long chain branched ethylene-based polymer.

Resin Production

All raw materials (ethylene, 1-octene) and the process solvent (a narrow boiling range high-purity isoparaffinic solvent trademarked Isopar E and commercially available from Exxon Mobil Corporation) are purified with molecular sieves before introduction into the reaction environment. Hydrogen is supplied in pressurized cylinders as a high purity grade and is not further purified. The reactor monomer feed (ethylene) stream is pressurized via mechanical compressor to above reaction pressure at 750 psig. The solvent and comonomer (1-octene) feed is pressurized via mechanical positive displacement pump to above reaction pressure at 750 psig. The individual catalyst components are manually batch diluted to specified component concentrations with purified solvent (Isopar E) and pressured to above reaction pressure at 750 psig. All reaction feed flows are measured with mass flow meters and independently controlled with computer automated valve control systems.

The continuous solution polymerization reactors consist of two liquid full, non-adiabatic, isothermal, circulating, and independently controlled loops operating in a series configuration. Each reactor has independent control of all fresh solvent, monomer, comonomer, hydrogen, and catalyst component feeds. The combined solvent, monomer, comonomer and hydrogen feed to each reactor is independently temperature controlled to anywhere between 5° C. to 50° C. and typically 40° C. by passing the feed stream through a heat exchanger. The fresh comonomer feed to the polymerization reactors can be manually aligned to add comonomer to one of three choices: the first reactor, the second reactor, or the common solvent and then split between both reactors proportionate to the solvent feed split. The total fresh feed to each polymerization reactor is injected into the reactor at two locations per reactor roughly with equal reactor volumes between each injection location. The fresh feed is controlled typically with each injector receiving half of the total fresh feed mass flow. The catalyst components are injected into the polymerization reactor through specially designed injection stingers and are each separately injected into the same relative location in the reactor with no contact time prior to the reactor. The primary catalyst component feed is computer controlled to maintain the reactor monomer concentration at a specified target. The two cocatalyst components are fed based on calculated specified molar ratios to the primary catalyst component. Immediately following each fresh injection location (either feed or catalyst), the feed streams are mixed with the circulating polymerization reactor contents with Kenics static mixing elements. The contents of each reactor are continuously circulated through heat exchangers responsible for removing much of the heat of reaction and with the temperature of the coolant side responsible for maintaining isothermal reaction environment at the specified temperature. Circulation around each reactor loop is provided by a screw pump. The effluent from the first polymerization reactor (containing solvent, monomer, comonomer, hydrogen, catalyst components, and molten polymer) exits the first reactor loop and passes through a control valve (responsible for maintaining the pressure of the first reactor at a specified target) and is injected into the second polymerization reactor of similar design. As the stream exits the reactor it is contacted with water to stop the reaction. In addition, various additives such as anti-oxidants, can be added at this point. The stream then goes through another set of Kenics static mixing elements to evenly disperse the catalyst kill and additives.

Following additive addition, the effluent (containing solvent, monomer, comonomer, hydrogen, catalyst components, and molten polymer) passes through a heat exchanger to raise the stream temperature in preparation for separation of the polymer from the other lower boiling reaction components. The stream then enters a two stage separation and devolatization system where the polymer is removed from the solvent, hydrogen, and unreacted monomer and comonomer. The recycled stream is purified before entering the reactor again. The separated and devolatized polymer melt is pumped through a die specially designed for underwater pelletization, cut into uniform solid pellets, dried, and transferred into a hopper. After validation of initial polymer properties the solid polymer pellets are manually dumped into a box for storage. Each box typically holds ~1200 pounds of polymer pellets.

The non-polymer portions removed in the devolatilization step pass through various pieces of equipment which separate most of the ethylene which is removed from the system to a vent destruction unit (it is recycled in manufacturing units). Most of the solvent is recycled back to the reactor after passing through purification beds. This solvent can still have unreacted co-monomer in it that is fortified with fresh co-monomer prior to re-entry to the reactor. This fortification of the co-monomer is an essential part of the product density control method. This recycle solvent can still have some hydrogen which is then fortified with fresh hydrogen to achieve the polymer molecular weight target. A very small amount of solvent leaves the system as a co-product due to solvent carrier in the catalyst streams and a small amount of solvent that is part of commercial grade co-monomers.

The following tables summarize the conditions for polymerization for examples of this invention.

| Inventive polymer | | |
|---|---|---|
| | | Avg. |
| 1. REACTOR FEED | | |
| C2 feed split | % | 59.13 |
| Selected Octene Feed Point | # | Loop1 |
| Selected Octene Flow | klbs/hr | 8.30 |
| Octene to Polymer Ratio | lb/lb | 15.6 |
| First Reactor Fresh Ethylene Flow | klbs/hr | 25.4 |
| First Reactor Solvent to Ethylene ratio | lb/lb | 6.00 |
| First Reactor Solvent Flow | klbs/hr | 158.4 |
| First Reactor Hydrogen Flow | lbs/hr | 6.4 |
| First Reactor Mole % Hydrogen | mol % | 0.35 |
| First Reactor Feed Temperature | ° C. | 12.3 |
| Second Reactor Fresh Ethylene Flow | klbs/hr | 18.1 |
| Second Reactor Solvent to Ethylene ratio | lb/lb | 2.70 |
| Second Reactor Solvent Flow | klbs/hr | 47.5 |

-continued

Inventive polymer

| | | Avg. |
|---|---|---|
| Second Reactor Hydrogen Flow | lbs/hr | 1.18 |
| Second Reactor Mole % Hydrogen | mol % | 0.092 |
| Second Reactor Feed Temperature | °C. | 12.0 |
| Recycle Solvent FTnIR [C2] | wt % | 0.75 |
| Recycle Solvent FTnIR [C8] | wt % | 6.68 |
| 2. REACTION | | |
| First Reactor FTnIR [C2] | g/l | 17.88 |
| First Reactor Tempered Water Inlet temp. | °C. | 131.6 |
| First Reactor Selected Temperature | °C. | 140.1 |
| First Reactor Loop Differential Pressure | psid | 46.88 |
| First Reactor 10Log Viscosity | LogcP | 2.950 |
| First Reactor Solution Density | g/cm3 | 0.6098 |
| First Reactor Pump speed | rpm | 977 |
| First Reactor Residence time | Min | 10.15 |
| First Reactor Recycle ratio | — | 7.58 |
| First Reactor low pressure feed ratio | lb/lb | 0.50 |
| First Reactor Polymer concentration | wt % | 13.43 |
| First Reactor Ethylene conversion by FTnIR | — | 79.48 |
| Second Reactor FTnIR [C2] | g/l | 7.80 |
| Second Reactor Tempered Water Inlet temp. | °C. | 176.8 |
| Second Reactor Selected Temperature | °C. | 190.0 |
| Second Reactor Loop Differential Pressure | psid | 39.30 |
| Second Reactor 10Log Viscosity | LogcP | 2.840 |
| Second Reactor Solution Density | g/cm3 | 0.5988 |
| Second Reactor Pump speed | rpm | 1166 |
| Second Reactor Residence time | Min | 7.30 |
| Second Reactor Recycle ratio | — | 6.51 |
| Second Reactor low pressure feed ratio | lb/lb | 0.09 |
| Second Reactor Polymer concentration | wt % | 20.88 |
| Overall Ethylene conversion by FTnIR | % | 92.64 |
| Overall Ethylene conversion by vent | % | 92.63 |
| Ethylene vent mass flow | lbs/hr | 1441 |
| 3. CATALYST | | |
| First Reactor DOC-6114 flow | lb/hr | 7.87 |
| First Reactor RIBS-2 flow | lb/hr | 6.37 |
| First Reactor MMAO-3A flow | lb/hr | 7.95 |
| Second Reactor DOC-6114 flow | lb/hr | 54.64 |
| Second Reactor RIBS-2 flow | lb/hr | 10.42 |
| Second Reactor MMAO-3A flow | lb/hr | 14.76 |
| First Reactor DOC-6114 concentration | wt % DOC-6114 | 0.25 |
| First Reactor RIBS-2 concentration | wt % RIBS-2 | 0.50 |
| First Reactor MMAO-3A (Al) concentration | wt % Al | 0.10 |
| Second Reactor DOC-6114 concentration | wt % DOC-6114 | 0.25 |
| Second Reactor RIBS-2 concentration | wt % RIBS-2 | 1.80 |
| Second Reactor MMAO-3A (Al) concentration | wt % Al | 0.10 |
| First Reactor RIBS-2 to Zr ratio | ratio | 1.42 |
| First Reactor Aluminum to Zr ratio | ratio | 16.17 |
| First Reactor Catalyst (Zr) efficiency | M lbs poly/lb Zr | 15.52 |
| First Reactor RIBS-2 efficiency | M lbs poly/lb RIBS-2 | 0.83 |
| Second Reactor RIBS-2 to Zr ratio | ratio | 1.20 |
| Second Reactor Aluminum to Zr ratio | ratio | 4.32 |
| Second Reactor Catalyst (Zr) efficiency | M lbs poly/lb Zr | 2.23 |
| Second Reactor RIBS-2 efficiency | M lbs poly/lb RIBS-2 | 0.14 |
| Overall Catalyst (Zr) efficiency | M lbs poly/lb Zr | 3.90 |
| Overall RIBS-2 efficiency | M lbs poly/lb RIBS-2 | 0.24 |
| 4. POLYMER | | |
| Melt Index, I2 (lab) | Dg/min | 0.79 |
| I10/I2 (lab) | Ratio | 8.07 |
| Density (lab) | g/cm3 | 0.9042 |
| Check-hopper production | klbs/hr | 49.59 |
| Polymer split | wt % | 50.00 |
| % Comonomer in Polymer | wt % | 16.54 |

CAS name for RIBS-2: Amines, bis(hydrogenated tallow alkyl)methyl, tetrakis(pentafluorophenyl)borate(1-)
CAS name for DOC-6114: Zirconium, [2,2'''[1,3-propanediylbis(oxy-κO)]bis[3'',5,5''-tris(1,1-dimethyl-ethyl)-5'-methyl[1,1':3',1''-terphenyl]-2'-olato-κO]]dimethyl-, (OC-6-33)-MMAO-3A = modified methyl aluminoxane Resin A Specifications Resin A has a target a melt index of 0.8 dg/min and a target density of 0.912 g/cc. It is produced in a dual reactor solution process where a constrained geometry catalyst is used in the first reactor and a Ziegler-Natta catalysts is used in the second reactor. The table below shows the melt index, density and % polymer split for the two reactors used to make Resin A.

| | Polymer Split (%) | Reactor 1 melt index (dg/min) | Reactor 1 density (kg/m$^3$) | Reactor 2 melt index (dg/min) | Reactor 2 density (kg/m$^3$) | Overall melt index (dg/min) | Overall Density (kg/m$^3$) |
|---|---|---|---|---|---|---|---|
| Resin A | 54.2 | 0.31 | 904.2 | 5.7 | 921.4 | 0.8 | 912 |

Test Methods

Density

Samples that are measured for density are prepared according to ASTM D 1928. Measurements are made within one hour of sample pressing using ASTM D792, Method B.

Melt Index

Melt index, or $I_2$, is measured in accordance with ASTM D 1238, Condition 190° C./2.16 kg, and is reported in grams eluted per 10 minutes. $I_{10}$ is measured in accordance with ASTM D 1238, Condition 190° C./10 kg, and is reported in grams eluted per 10 minutes.

DSC Crystallinity

Differential Scanning Calorimetry (DSC) can be used to measure the melting and crystallization behavior of a polymer over a wide range of temperature. For example, the TA Instruments Q1000 DSC, equipped with an RCS (refrigerated cooling system) and an autosampler is used to perform this analysis. During testing, a nitrogen purge gas flow of 50 ml/min is used. Each sample is melt pressed into a thin film at about 175° C.; the melted sample is then air-cooled to room temperature (~25° C.). A 3-10 mg, 6 mm diameter specimen is extracted from the cooled polymer, weighed, placed in a light aluminum pan (ca 50 mg), and crimped shut. Analysis is then performed to determine its thermal properties.

The thermal behavior of the sample is determined by ramping the sample temperature up and down to create a heat flow versus temperature profile. First, the sample is rapidly heated to 180° C. and held isothermal for 3 minutes in order to remove its thermal history. Next, the sample is cooled to −40° C. at a 10° C./minute cooling rate and held isothermal at −40° C. for 3 minutes. The sample is then heated to 150° C. (this is the "second heat" ramp) at a 10° C./minute heating rate. The cooling and second heating curves are recorded. The cool curve is analyzed by setting baseline endpoints from the beginning of crystallization to −20° C. The heat curve is analyzed by setting baseline endpoints from −20° C. to the end of melt. The values determined are peak melting temperature ($T_m$), peak crystallization temperature ($T_c$), heat of fusion ($H_f$) (in Joules per gram), and the calculated % crystallinity for polyethylene samples using Equation 6:

$$\% \text{ Crystallinity} = ((H_f)/(292 \text{ J/g})) \times 100 \quad \text{(Eq. 6)}.$$

The heat of fusion ($H_f$) and the peak melting temperature are reported from the second heat curve. Peak crystallization temperature is determined from the cooling curve.

Gel Permeation Chromatography (GPC)

The GPC system consists of a Waters (Milford, Mass.) 150 C high temperature chromatograph (other suitable high temperatures GPC instruments include Polymer Laboratories (Shropshire, UK) Model 210 and Model 220) equipped with an on-board differential refractometer (RI). Additional detectors can include an IR4 infra-red detector from Polymer ChAR (Valencia, Spain), Precision Detectors (Amherst, Mass.) 2-angle laser light scattering detector Model 2040, and a Viscotek (Houston, Tex.) 150R 4-capillary solution viscometer. A GPC with the last two independent detectors and at least one of the first detectors is sometimes referred to as "3D-GPC", while the term "GPC" alone generally refers to conventional GPC. Depending on the sample, either the 15-degree angle or the 90-degree angle of the light scattering detector is used for calculation purposes. Data collection is performed using Viscotek TriSEC software, Version 3, and a 4-channel Viscotek Data Manager DM400. The system is also equipped with an on-line solvent degassing device from Polymer Laboratories (Shropshire, UK). Suitable high temperature GPC columns can be used such as four 30 cm long Shodex HT803 13 micron columns or four 30 cm Polymer Labs columns of 20-micron mixed-pore-size packing (MixA LS, Polymer Labs). The sample carousel compartment is operated at 140° C. and the column compartment is operated at 150° C. The samples are prepared at a concentration of 0.1 grams of polymer in 50 milliliters of solvent. The chromatographic solvent and the sample preparation solvent contain 200 ppm of butylated hydroxytoluene (BHT). Both solvents are sparged with nitrogen. The polyethylene samples are gently stirred at 160° C. for four hours. The injection volume is 200 microliters. The flow rate through the GPC is set at 1 ml/minute.

The GPC column set is calibrated before running the Examples by running twenty-one narrow molecular weight distribution polystyrene standards. The molecular weight (MW) of the standards ranges from 580 to 8,400,000 grams per mole, and the standards are contained in 6 "cocktail" mixtures. Each standard mixture has at least a decade of separation between individual molecular weights. The standard mixtures are purchased from Polymer Laboratories (Shropshire, UK). The polystyrene standards are prepared at 0.025 g in 50 mL of solvent for molecular weights equal to or greater than 1,000,000 grams per mole and 0.05 g in 50 ml of solvent for molecular weights less than 1,000,000 grams per mole. The polystyrene standards were dissolved at 80° C. with gentle agitation for 30 minutes. The narrow standards mixtures are run first and in order of decreasing highest molecular weight component to minimize degradation. The polystyrene standard peak molecular weights are converted to polyethylene $M_w$ using the Mark-Houwink K and a (sometimes referred to as α) values mentioned later for polystyrene and polyethylene. See the Examples section for a demonstration of this procedure.

With 3D-GPC absolute weight average molecular weight ("$M_{w, Abs}$") and intrinsic viscosity are also obtained independently from suitable narrow polyethylene standards using the same conditions mentioned previously. These narrow linear polyethylene standards may be obtained from Polymer Laboratories (Shropshire, UK; Part No.'s PL2650-0101 and PL2650-0102).

The systematic approach for the determination of multi-detector offsets is performed in a manner consistent with that published by Balke, Mourey, et al. (Mourey and Balke, Chromatography Polym., Chapter 12, (1992)) (Balke, Thitiratsakul, Lew, Cheung, Mourey, Chromatography Polym., Chapter 13, (1992)), optimizing triple detector log ($M_w$ and intrinsic viscosity) results from Dow 1683 broad polystyrene (American Polymer Standards Corp.; Mentor, Ohio) or its equivalent to the narrow standard column calibration results from the narrow polystyrene standards calibration curve. The molecular weight data, accounting for detector volume offset determination, are obtained in a manner consistent with that published by Zimm (Zimm, B. H., *J. Chem. Phys.*, 16, 1099 (1948)) and Kratochvil (Kratochvil, P., *Classical Light Scattering from Polymer Solutions*, Elsevier, Oxford, N.Y. (1987)). The overall injected concentration used in the determination of the molecular weight is obtained from the mass detector area and the mass detector constant derived from a suitable linear polyethylene homopolymer, or one of the polyethylene standards. The calculated molecular weights are obtained using a light scattering constant derived from one or more of the polyethylene standards mentioned and a refractive index concentration coefficient, dn/dc, of 0.104. Generally, the mass detector response and the light scattering constant should be determined from a linear standard with a molecular weight in excess of about 50,000 daltons. The viscometer calibration can be accomplished using the methods described by the manufacturer or alternatively by using the published values of suitable linear standards such as Standard Reference Materials (SRM) 1475a, 1482a, 1483, or 1484a. The chromatographic concentrations are assumed low enough to eliminate addressing $2^{nd}$ viral coefficient effects (concentration effects on molecular weight).

g' by 3D-GPC

The index (g') for the sample polymer is determined by first calibrating the light scattering, viscosity, and concentration detectors described in the Gel Permeation Chromatography method supra with SRM 1475a homopolymer polyethylene (or an equivalent reference). The light scattering and viscometer detector offsets are determined relative to the concentration detector as described in the calibration. Baselines are subtracted from the light scattering, viscometer, and concentration chromatograms and integration windows are then set making certain to integrate all of the low molecular weight retention volume range in the light scattering and viscometer chromatograms that indicate the presence of detectable polymer from the refractive index chromatogram. A linear homopolymer polyethylene is used to establish a Mark-Houwink (MH) linear reference line by injecting a broad molecular weight polyethylene reference such as SRM1475a standard, calculating the data file, and recording the intrinsic viscosity (IV) and molecular weight ($M_w$), each derived from the light scattering and viscosity detectors respectively and the concentration as determined from the RI detector mass constant for each chromatographic slice. For the analysis of samples the procedure for each chromatographic slice is repeated to obtain a sample Mark-Houwink line. Note that for some samples the lower molecular weights, the intrinsic viscosity and the molecular weight data may need to be extrapolated such that the measured molecular weight and intrinsic viscosity asymptotically approach a linear homopolymer GPC calibration curve. To this end, many highly-branched ethylene-based polymer samples require that the linear reference line be shifted slightly to account for the contribution of short chain branching before proceeding with the long chain branching index (g') calculation.

A g-prime ($g_i'$) is calculated for each branched sample chromatographic slice (i) and measuring molecular weight ($M_i$) according to Equation 7:

$$g_i' = (IV_{Sample,i}/IV_{linear\ reference,j}) \quad \text{(Eq. 7)},$$

where the calculation utilizes the $IV_{linear\ reference,j}$ at equivalent molecular weight, $M_j$, in the linear reference sample. In other words, the sample IV slice (i) and reference IV slice (j) have the same molecular weight ($M_i = M_j$). For simplicity, the $IV_{linear\ reference,j}$ slices are calculated from a fifth-order polynomial fit of the reference Mark-Houwink Plot. The IV ratio, or $g_i'$, is only obtained at molecular weights greater than 3,500 because of signal-to-noise limitations in the light scattering data. The number of branches along the sample polymer ($B_n$) at each data slice (i) can be determined by using Equation 8, assuming a viscosity shielding epsilon factor of 0.75:

$$\left[\frac{IV_{Sample,i}}{IV_{linear\_reference,j}}\right]_{M_i=j}^{1.33} = \left[\left(1 + \frac{B_{n,i}}{7}\right)^{1/2} + \frac{4}{9}\frac{B_{n,i}}{\pi}\right]^{-1/2}. \quad \text{(Eq. 8)}$$

Finally, the average LCBf quantity per 1000 carbons in the polymer across all of the slices (i) can be determined using Equation 9:

$$LCBf = \frac{\sum_{M=3500}^{i}\left(\frac{B_{n,i}}{M_i/14000}c_i\right)}{\sum c_i}. \quad \text{(Eq. 9)}$$

gpcBR Branching Index by 3D-GPC

In the 3D-GPC configuration the polyethylene and polystyrene standards can be used to measure the Mark-Houwink constants, K and α, independently for each of the two polymer types, polystyrene and polyethylene. These can be used to refine the Williams and Ward polyethylene equivalent molecular weights in application of the following methods.

The gpcBR branching index is determined by first calibrating the light scattering, viscosity, and concentration detectors as described previously. Baselines are then subtracted from the light scattering, viscometer, and concentration chromatograms. Integration windows are then set to ensure integration of all of the low molecular weight retention volume range in the light scattering and viscometer chromatograms that indicate the presence of detectable polymer from the refractive index chromatogram. Linear polyethylene standards are then used to establish polyethylene and polystyrene Mark-Houwink constants as described previously. Upon obtaining the constants, the two values are used to construct two linear reference conventional calibrations ("cc") for polyethylene molecular weight and polyethylene intrinsic viscosity as a function of elution volume, as shown in Equations 10 and 11:

$$M_{PE} = \left(\frac{K_{PS}}{K_{PE}}\right)^{1/\alpha_{PE}+1} \cdot M_{PS}^{\alpha_{PS}+1/\alpha_{PE}+1}, \quad \text{(Eq. 10)}$$

and $$[\eta]_{PE} = K_{PS} \cdot M_{PS}^{\alpha+1}/M_{PE}. \quad \text{(Eq. 11)}$$

The gpcBR branching index is a robust method for the characterization of long chain branching. See Yau, Wallace W., "Examples of Using 3D-GPC—TREF for Polyolefin Characterization", *Macromol. Symp.*, 2007, 257, 29-45. The index avoids the slice-by-slice 3D-GPC calculations traditionally used in the determination of g' values and branching frequency calculations in favor of whole polymer detector areas and area dot products. From 3D-GPC data, one can obtain the sample bulk $M_w$ by the light scattering (LS) detector using the peak area method. The method avoids the slice-by-slice ratio of light scattering detector signal over the concentration detector signal as required in the g' determination.

$$M_W = \sum_i w_i M_i \quad \text{(Eq. 12)}$$

$$= \sum_i \left(\frac{C_i}{\sum_i C_i}\right) M_i$$

$$= \frac{\sum_i C_i M_i}{\sum_i C_i}$$

$$= \frac{\sum_i LS_i}{\sum_i C_i}$$

$$= \frac{LS \text{ Area}}{\text{Conc. Area}}.$$

The area calculation in Equation 12 offers more precision because as an overall sample area it is much less sensitive to variation caused by detector noise and GPC settings on baseline and integration limits. More importantly, the peak area calculation is not affected by the detector volume offsets. Similarly, the high-precision sample intrinsic viscosity (IV) is obtained by the area method shown in Equation 13:

$$IV = [\eta] \quad \text{(Eq. 13)}$$

$$= \sum_i w_i IV_i$$

$$= \sum_i \left(\frac{C_i}{\sum_i C_i}\right) IV_i$$

$$= \frac{\sum_i C_i IV_i}{\sum_i C_i}$$

$$= \frac{\sum_i DP_i}{\sum_i C_i}$$

$$= \frac{DP \text{ Area}}{\text{Conc. Area}},$$

where $DP_i$ stands for the differential pressure signal monitored directly from the online viscometer.

To determine the gpcBR branching index, the light scattering elution area for the sample polymer is used to determine the molecular weight of the sample. The viscosity detector elution area for the sample polymer is used to determine the intrinsic viscosity (IV or $[\eta]$) of the sample.

Initially, the molecular weight and intrinsic viscosity for a linear polyethylene standard sample, such as SRM1475a or an equivalent, are determined using the conventional calibrations for both molecular weight and intrinsic viscosity as a function of elution volume, per Equations 14 and 15:

$$Mw_{CC} = \sum_i \left(\frac{C_i}{\sum_i C_i}\right) M_i = \sum_i w_i M_i, \quad \text{(Eq. 14)}$$

and $$[\eta]_{CC} = \sum_i \left(\frac{C_i}{\sum_i C_i}\right) IV_i = \sum_i w_i IV_i. \quad \text{(Eq. 15)}$$

Equation 16 is used to determine the gpcBR branching index:

$$gpcBR = \left[\left(\frac{[\eta]_{CC}}{[\eta]}\right) \cdot \left(\frac{M_W}{M_{W,CC}}\right)^{\alpha_{PE}} - 1\right], \quad \text{(Eq. 16)}$$

where $[\eta]$ is the measured intrinsic viscosity, $[\eta]_{cc}$ is the intrinsic viscosity from the conventional calibration, $M_w$ is the measured weight average molecular weight, and $M_{w,cc}$ is the weight average molecular weight of the conventional calibration. The Mw by light scattering (LS) using Equation (12) is commonly referred to as the absolute Mw; while the Mw,cc from Equation (14) using the conventional GPC molecular weight calibration curve is often referred to as polymer chain Mw. All statistical values with the "cc" subscript are determined using their respective elution volumes, the corresponding conventional calibration as previously described, and the concentration ($C_i$) derived from the mass detector response. The non-subscripted values are measured values based on the mass detector, LALLS, and viscometer areas. The value of $K_{PE}$ is adjusted iteratively until the linear reference sample has a gpcBR measured value of zero. For example, the final values for $\alpha$ and Log K for the determination of gpcBR in this particular case are 0.725 and −3.355, respectively, for polyethylene, and 0.722 and −3.993 for polystyrene, respectively.

Once the K and $\alpha$ values have been determined, the procedure is repeated using the branched samples. The branched samples are analyzed using the final Mark-Houwink constants as the best "cc" calibration values and applying Equations 12-16. The interpretation of gpcBR is straight forward. For linear polymers, gpcBR calculated from Equation 16 will be close to zero since the values measured by LS and viscometry will be close to the conventional calibration standard. For branched polymers, gpcBR will be higher than zero, especially with high levels of LCB, because the measured polymer $M_w$ will be higher than the calculated $M_{w,cc}$, and the calculated $IV_{cc}$ will be higher than the measured polymer IV. In fact, the gpcBR value represents the fractional IV change due the molecular size contraction effect as the result of polymer branching. A gpcBR value of 0.5 or 2.0 would mean a molecular size contraction effect of IV at the level of 50% and 200%, respectively, versus a linear polymer molecule of equivalent weight.

For these particular Examples, the advantage of using gpcBR in comparison to the g' index and branching frequency calculations is due to the higher precision of gpcBR. All of the parameters used in the gpcBR index determination are obtained with good precision and are not detrimentally affected by the low 3D-GPC detector response at high molecular weight from the concentration detector. Errors in detector volume alignment also do not affect the precision of the gpcBR index determination. In other particular cases, other methods for determining $M_w$ moments may be preferable to the aforementioned technique.

Unless otherwise stated, implicit from the context or conventional in the art, all parts and percentages are based on weight.

All applications, publications, patents, test procedures, and other documents cited, including priority documents, are fully incorporated by reference to the extent such disclosure is not inconsistent with the disclosed compositions and methods and for all jurisdictions in which such incorporation is permitted.

CEF Method

Comonomer distribution analysis is performed with Crystallization Elution Fractionation (CEF) (PolymerChar in Spain) (B. Monrabal et al, Macromol. Symp. 257, 71-79 (2007)). Ortho-dichlorobenzene (ODCB) with 600 ppm antioxidant butylated hydroxytoluene (BHT) is used as solvent. Sample preparation is done with autosampler at 160° C. for 2 hours under shaking at 4 mg/ml (unless otherwise specified). The injection volume is 300 μl. The temperature profile of CEF is: crystallization at 3° C./min from 110° C. to 30° C., the thermal equilibrium at 30° C. for 5 minutes, elution at 3°

C./min from 30° C. to 140° C. The flow rate during crystallization is at 0.052 ml/min. The flow rate during elution is at 0.50 ml/min. The data is collected at one data point/second.

CEF column is packed by the Dow Chemical Company with glass beads at 125 um±6% (MO-SCI Specialty Products) with ⅛ inch stainless tubing. Glass beads are acid washed by MO-SCI Specialty with the request from the Dow Chemical Company. Column volume is 2.06 ml. Column temperature calibration is performed by using a mixture of NIST Standard Reference Material Linear polyethylene 1475a (1.0 mg/ml) and Eicosane (2 mg/ml) in ODCB. Temperature is calibrated by adjusting elution heating rate so that NIST linear polyethylene 1475a has a peak temperature at 101.0° C., and Eicosane has a peak temperature of 30.0° C. The CEF column resolution is calculated with a mixture of NIST linear polyethylene 1475a (1.0 mg/ml) and hexacontane (Fluka, purum, ≧97.0%, 1 mg/ml). A baseline separation of hexacontane and NIST polyethylene 1475a is achieved. The area of hexacontane (from 35.0 to 67.0° C.) to the area of NIST 1475a from 67.0 to 110.0° C. is 50 to 50, the amount of soluble fraction below 35.0° C. is <1.8 wt %. The CEF column resolution is defined as:

$$\text{Resolution} = \frac{\text{Peak temperature of } NIST\ 1475a - \text{Peak Temperature of Hexacontane}}{\text{Half-height Width of } NIST\ 1475a + \text{Half-height Width of Hexacontane}}$$

The column resolution is 6.0

CDC Method

Comonomer distribution constant (CDC) is calculated from comonomer distribution profile by CEF. CDC is defined as Comonomer Distribution Index divided by Comonomer Distribution Shape Factor multiplying by 100 (Equation 1)

$$CDC = \frac{\text{Comonomer Distribution Index}}{\text{Comonomer Distribution Shape Factor}} \quad \text{Equation 1}$$

$$= \frac{\text{Comonomer Distribution Index}}{\text{Half Width}/Stdev} * 100$$

Comonomer distribution index stands for the total weight fraction of polymer chains with the comonomer content ranging from 0.5 of median comonomer content ($C_{median}$) and 1.5 of $C_{median}$ from 35.0 to 119.0° C. Comonomer Distribution Shape Factor is defined as a ratio of the half width of comonomer distribution profile divided by the standard deviation of comonomer distribution profile from the peak temperature ($T_p$).

CDC is calculated according to the following steps:

Obtain weight fraction at each temperature (T) ($w_T(T)$) from 35.0° C. to 119.0° C. with a temperature step of 0.200° C. from CEF according Equation 2.

$$\int_{35}^{119.0} w_T(T)\,dT = 1 \quad \text{Equation 2}$$

Calculate the median temperature ($T_{median}$) at cumulative weight fraction of 0.500 (Equation 3)

$$\int_{35}^{T_{median}} w_T(T)\,dT = 0.5 \quad \text{Equation 3}$$

Calculate the corresponding median comonomer content in mole % ($C_{median}$) at the median temperature ($T_{median}$) by using comonomer content calibration curve (Equation 4).

$$\ln(1 - comonomer content) = -\frac{207.26}{273.12 + T} + 0.5533 \quad \text{Equation 4}$$

$$R^2 = 0.997$$

(3i). Comonomer content calibration curve is constructed by using a series of reference materials with known amount of comonomer content. Eleven reference materials with narrow comonomer distribution (mono modal comonomer distribution in CEF from 35.0 to 119.0° C.) with weight average Mw of 35,000 to 115,000 (by conventional GPC) at a comonomer content ranging from 0.0 mole % to 7.0 mole % are analyzed with CEF at the same experimental conditions specified in CEF experimental sections.

(3ii). Comonomer content calibration is calculated by using the peak temperature ($T_p$) of each reference material and its comonomer content. The calibration is: $R^2$ is the correlation constant.

Comonomer Distribution Index is the total weight fraction with a comonomer content ranging from $0.5*C_{median}$ to $1.5*C_{median}$. If $T_{median}$ is higher than 98.0° C., Comonomer Distribution Index is defined as 0.95.

Maximum peak height is obtained from CEF comonomer distribution profile by searching each data point for the highest peak from 35.0° C. to 119.0° C. (if the two peaks are identical then the lower temperature peak is selected) Half width is defined as the temperature difference between the front temperature and the rear temperature at the half of the maximum peak height. The front temperature at the half of the maximum peak is searched forward from 35.0° C., while the rear temperature at the half of the maximum peak is searched backward from 119.0° C. In the case of a well defined bimodal distribution where the difference in the peak temperatures being equal to or larger than 1.1 times of the sum of half width of each peak, the half-width of the polymer is calculated as the arithmetic average of the half width of each peak.

The standard deviation of temperature (Stdev) is calculated according Equation 5:

$$Stdev = \sqrt{\sum_{35.0}^{119.0} (T - T_p)^2 * w_T(T)} \quad \text{Equation 5}$$

Figure 1:
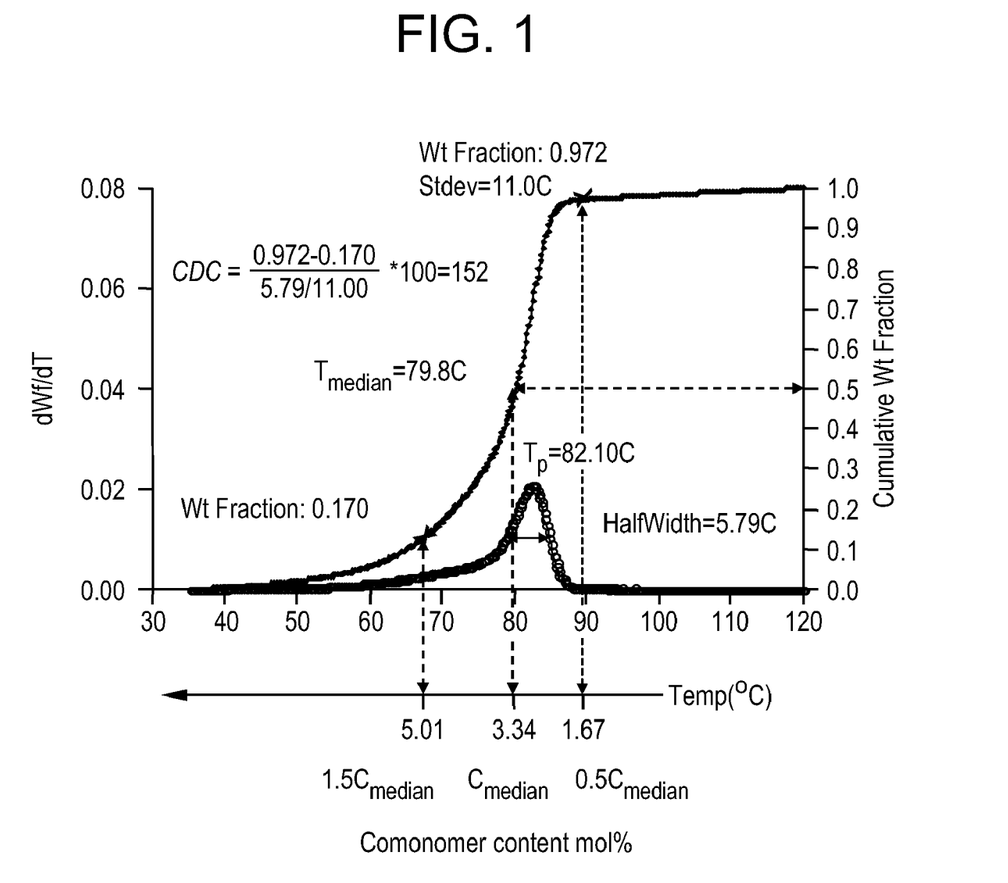
FIG. 1 is a schematic drawing for obtaining peak temperature, half width and median temperature from crystallization elution fractionation (CEF).

An example of comonomer distribution profile is shown in FIG. 1.

$M_{w-gpc}$ Determination

To obtain $M_{w-gpc}$ values, the chromatographic system consist of either a Polymer Laboratories Model PL-210 or a Polymer Laboratories Model PL-220. The column and carousel compartments are operated at 140° C. Three Polymer Laboratories 10-μm Mixed-B columns are used with a solvent of 1,2,4-trichlorobenzene. The samples are prepared at a concentration of 0.1 g of polymer in 50 mL of solvent. The solvent used to prepare the samples contain 200 ppm of the antioxidant butylated hydroxytoluene (BHT). Samples are prepared by agitating lightly for 4 hours at 160° C. The injection volume used is 100 microliters and the flow rate is 1.0 mL/min. Calibration of the GPC column set is performed with twenty one narrow molecular weight distribution polystyrene standards purchased from Polymer Laboratories. The polystyrene standard peak molecular weights are converted to polyethylene molecular weights using $$M_{polyethylene} = A(M_{polystyrene})^B \quad \text{(Eq. 17)}$$

where M is the molecular weight, A has a value of 0.4316 and B is equal to 1.0. A third order polynomial is determined to build the logarithmic molecular weight calibration as a function of elution volume. Polyethylene equivalent molecular weight calculations are performed using Viscotek TriSEC software Version 3.0. The precision of the weight-average molecular weight $\Delta M_w$ is excellent at <2.6%.

¹H NMR Method 3.26 g of stock solution is added to 0.133 g of polyolefin sample in 10 mm NMR tube. The stock solution is a mixture of tetrachloroethane-$d_2$ (TCE) and perchloroethylene (50:50, w:w) with 0.001M $Cr^{3+}$. The solution in the tube is purged with $N_2$ for 5 minutes to reduce the amount of oxygen. The capped sample tube is left at room temperature overnight to swell the polymer sample. The sample is dissolved at 110° C. with shaking. The samples are free of the additives that may contribute to unsaturation, e.g. slip agents such as erucamide.

The ¹H NMR are run with a 10 mm cryoprobe at 120° C. on Bruker AVANCE 400 MHz spectrometer. The pulse sequence is shown in Table below.

```
;lc1prf2_zz
prosol relations=<lcnmr>
#include <Avance.incl>
"d12=20u"
"d11=4u"
1 ze
d12 pl21:f2
2 30m
d13
d12 pl9:f1
d1 cw:f1 ph29 cw:f2 ph29
d11 do:f1 do:f2
d12 pl1:f1
p1 ph1
go=2 ph31
30m mc #0 to 2 F0(zd)
exit
ph1=0 2 2 0 1 3 3 1
ph29=0
ph31=0 2 2 0 1 3 3 1
```

Two experiments are run to get the unsaturation: the control and the double presaturation experiments.

For the control experiment, the data is processed with exponential window function with LB=1 Hz, baseline was corrected from 7 to −2 ppm. The signal from residual ¹H of TCE is set to 100, the integral $I_{total}$ from −0.5 to 3 ppm is used as the signal from whole polymer in the control experiment. The number of $CH_2$ group, $NCH_2$, in the polymer is calculated as following:

$$NCH_2 = I_{total}/2 \quad \text{(Eq. 19)}.$$

Figure 2:
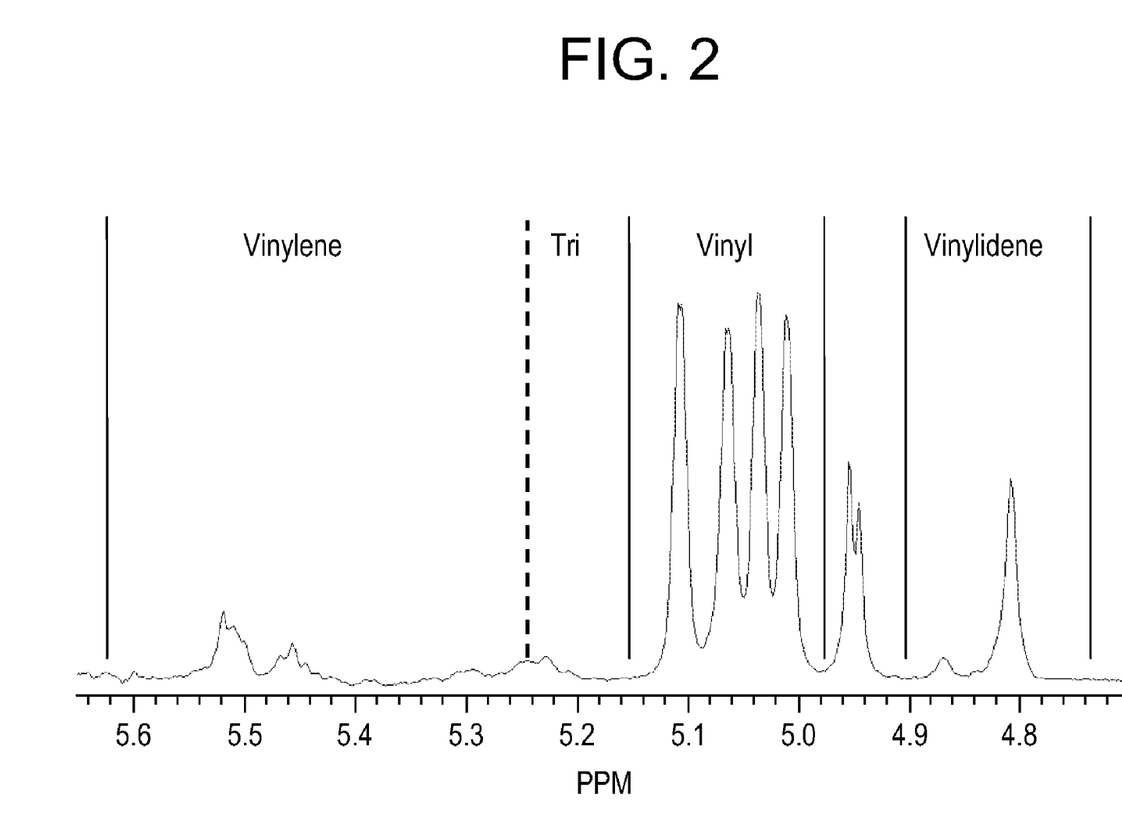
FIG. 2 displays integration limits for unsaturation for Example 3.

For the double presaturation experiment, the data is processed with exponential window function with LB=1 Hz, baseline was corrected from 6.6 to 4.5 ppm. The signal from residual ¹H of TCE is set to 100, the corresponding integrals for unsaturations ($I_{vinylene}$, $I_{trisubstituted}$, and $I_{vinylidene}$) were integrated based on the region shown in the following FIG. 2. The number of unsaturation unit for vinylene, trisubstituted, vinyl and vinylidene are calculated:

$$N_{vinylene} = I_{vinylene}/2$$

$$N_{trisubstituted} = I_{trisubstituted}$$

$$N_{vinyl} = I_{vinyl}/2$$

$$N_{vinylidene} = I_{vinylidene}/2$$

The unsaturation unit/1,000,000 carbons is calculated as following:

$$N_{vinylene}/1,000,000\ C = (N_{vinylene}/NCH_2)*1,000,000$$

$$N_{trisubstituted}/1,000,000\ C = (N_{trisubstituted}/NCH_2)*1,000,000$$

$$N_{vinyl}/1,000,000\ C = (N_{vinyl}/NCH_2)*1,000,000$$

$$N_{vinylidene}/1,000,000\ C = (N_{vinylidene}/NCH_2)*1,000,000$$

| Group | Structure | Notation |
|---|---|---|
| Vinylene | (P, H / H, R₁ alkene) | Vinylene1 |
|  | (P, R₁ / H, H alkene) |  |
|  | (P, H / H, — alkene) | Vinylene2 |
|  | (P, / H, H alkene) |  |
|  | (P, H / H, R₁ branched alkene, R₂) | Vinylene3 |
| Trisubstituted unsaturation | (P, R₁ / H — alkene) | Trisubstituted |
|  | (P, / H, R₁ alkene) |  |
|  | (P, R₁ / H, — alkene) |  |
|  | (P, R₁CH₃ / H, R₂CH₃ alkene) |  |

-continued

| Group | Structure | Notation |
|---|---|---|
| Vinyl | [structure] | |
| | [structure] | Vinyl1 |
| | [structure] | Vinyl2 |
| | [structure] | Vinyl3 |
| Vinylidene | [structure] | Vinylidene1 |
| | [structure] | Vinylidene2 |
| | [structure] | Vinylidene3 |

Gel Content

Gel content is determined in accordance to ASTM D2765-01 Method A in xylene. The sample is cut to required size using a razor blade.

Film Testing Conditions

The following physical properties are measured on the films produced:

Total (Overall), Surface and Internal Haze: Samples measured for internal haze and overall haze are sampled and prepared according to ASTM D 1003. Internal haze was obtained via refractive index matching using mineral oil on both sides of the films. A Hazeguard Plus (BYK-Gardner USA; Columbia, Md.) is used for testing. Surface haze is determined as the difference between overall haze and internal haze.

45° Gloss: ASTM D-2457.

MD and CD Elmendorf Tear Strength: ASTM D-1922.

MD and CD Tensile Strength: ASTM D-882.

Dart Impact Strength: ASTM D-1709.

Puncture Strength: Puncture is measured on a Instron Model 4201 with Sintech Testworks Software Version 3.10. The specimen size is 6 inch×6 inch and 4 measurements are made to determine an average puncture value. The film is conditioned for 40 hours after film production and at least 24 hours in an ASTM controlled laboratory. A 100 lb load cell is used with a round specimen holder 12.56 square inches. The puncture probe is a ½ inch diameter polished stainless steel ball with a 7.5 inch maximum travel length. There is no gauge length; the probe is as close as possible to, but not touching, the specimen. The crosshead speed used is 10 inches/minute. The thickness is measured in the middle of the specimen. The thickness of the film, the distance the crosshead traveled, and the peak load are used to determine the puncture by the software. The puncture probe is cleaned using a "Kim-wipe" after each specimen.

Stretch hooder 100/75 test:

A film sample of dimensions 100 mm×25 mm and given thickness was used for the stretch hooder 100/75 test. The film sample was stretched to 100% elongation at a speed of 1000 mm/min using Instron 5581 mechanical testing system. When 100% elongation was reached, film sample was kept in this position for 15 seconds and then returned back to 75% elongation at a speed of 1000 mm/min. After waiting at this elongation for 5 minutes, load on the sample was measured and recorded as holding force. Afterwards, the Instron grips were returned to zero elongation and film sample was removed. After 24 hours of waiting at ambient conditions, final length of the film was measured and permanent deformation was calculated using the following equation.

$$\% \text{ permanent deformation} = \frac{\text{final length} - \text{initial length}}{\text{initial length}} \times 100$$

Elastic recover was calculated as

Elastic recovery=100−permanent deformation 5 specimens were used for each sample and average values for holding force, permanent set and elastic recovery are reported.

Stretch hooder 60/40 test

This test is very similar to stretch hooder 100/75 test except that initially the film sample is stretched to 60% elongation at a speed of 1000 mm/min, held there for 15 seconds and then returned to 40% elongation at same speed. Holding force was measured after waiting for 5 minutes at 40% elongation. The procedure for measuring permanent set and elastic recovery are exactly the same as the stretch hooder 100/75 test method.

Figure 3:
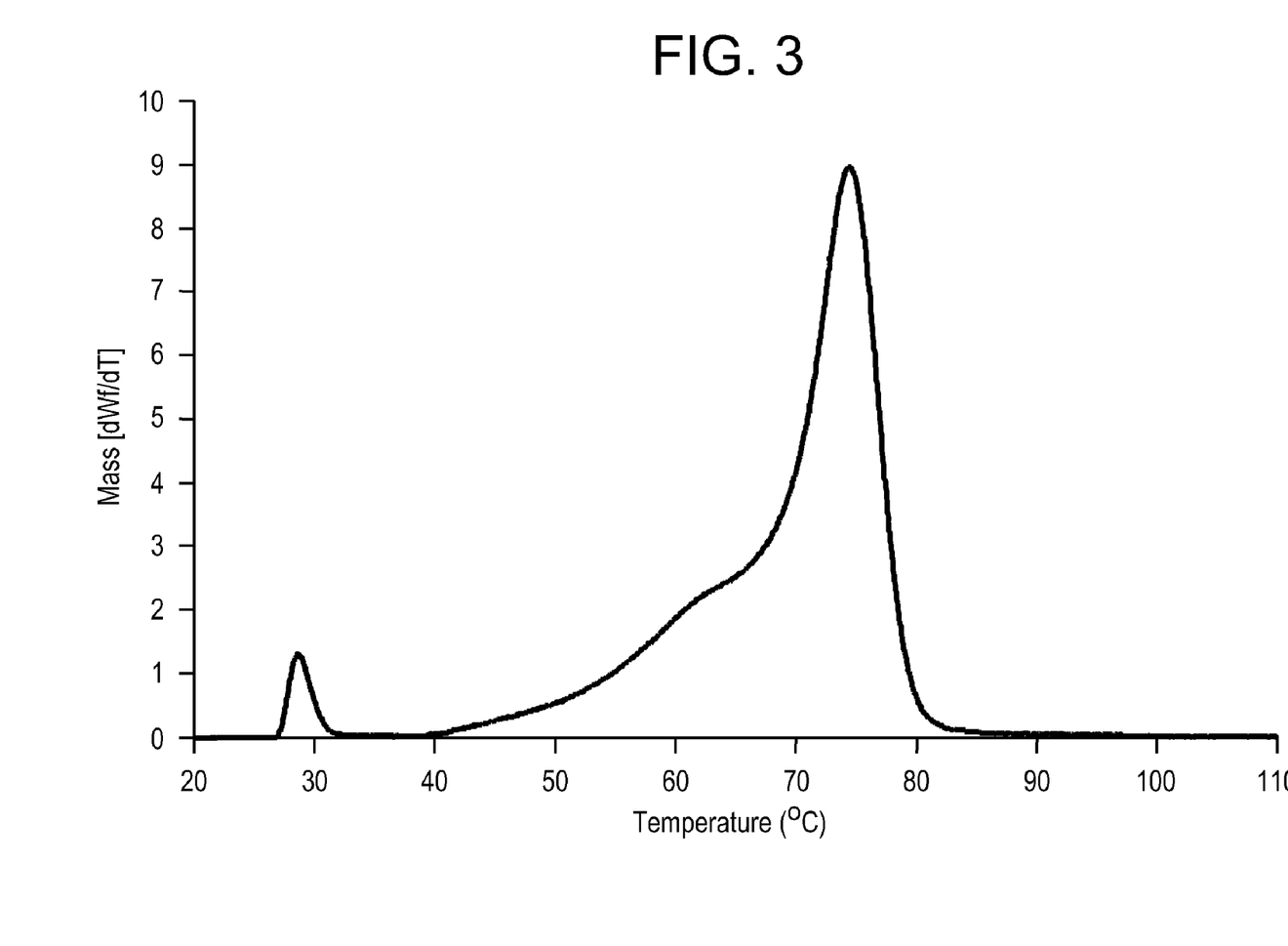
FIG. 3 plots crystallization elution fractionation (CEF) data for inventive polymer.

The plot in FIG. 3 shows crystallization elution fractionation (CEF) data for the inventive polymer in Examples 1 and 2

| | | Unsaturation Unit/1,000,000 C | | | | |
|---|---|---|---|---|---|---|
| | | vinylene | trisubstituted | vinyl | vinylidene | Total |
| Ex. 1 | inventive polymer | 16 | 7 | 55 | 12 | 90 |

| ID | | Comonomer dist. Index | Stdev, °C. | HalfWidth, °C. | HalfWidth/ Stdev | CDC(Comonomer Dist. Constant) |
|---|---|---|---|---|---|---|
| Ex. 1 | inventive polymer | 89.10 | 9.48 | 6.61 | 0.70 | 127.9 |

| DSC Sample | | Cool Curve Data | | 2nd Heat Curve Data | | DeltaH above 115° C. (J/g) |
|---|---|---|---|---|---|---|
| | | Tc (C.) | DeltaH cryst (J/g) | Tm (C.) | DeltaH melt (J/g) | |
| Ex 1 | inventive polymer | 83.7 | 104.9 | 99.5 | 105.5 | 0.027 |

| Identification | | Mn (g/mole) | Conventional GPC Mw (g/mole) | Mz (g/mole) | Mw/Mn |
|---|---|---|---|---|---|
| EX 1 | inventive polymer | 34,880 | 101,200 | 201,500 | 2.90 |

Film Fabrication:

All resins are blown into three layer co-extruded films produced on an Alpine seven layer blown film line. The blown film line consists of seven groove fed extruders with single flight screws (all 50 mm). The length/diameter (L/D) ratio for all screws is 30:1. The blown film line has a 250 mm die with dual lip air ring cooling system, with a screen pack configuration of 20:40:60:80:20 mesh and is equipped with internal bubble cooling system. All films are produced at 4 mil thickness.

Extrusion Data—Example 1

Extruders 1 and 7 contained 93.5 wt % of Resin A, 5 wt % of antiblock master batch, 1.5 wt % of slip master batch and 0.5 wt % of process aid master batch. Extruders 2 through 6 contained 98.5 wt % of inventive polymer, 1 wt % of slip master batch and 0.5 wt % of process aid masterbatch.

| | Screw speed (RPM) | Load | Melt temperature (° F.) | Melt pressure (psi) | Layer % | Output (lb/hr) |
|---|---|---|---|---|---|---|
| Extruder 1 | 49.3 | 59 | 467 | 6354 | 20 | 75 |
| Extruder 2 | 42.1 | 53.3 | 472.7 | 5403 | 12 | 45 |
| Extruder 3 | 42.4 | 53.9 | 472.7 | 5678 | 12 | 45 |
| Extruder 4 | 43.6 | 52.7 | 454.7 | 476 | 12 | 45 |
| Extruder 5 | 43.1 | 50 | 453 | 4257 | 12 | 45 |
| Extruder 6 | 42.4 | 54.1 | 474.8 | 5506 | 12 | 45 |
| Extruder 7 | 49 | 58.8 | 462.2 | 7328 | 20 | 75 |

| Actual Temperature profile (° F.) | Extruder 1 | Extruder 2 | Extruder 3 | Extruder 4 | Extruder 5 | Extruder 6 | Extruder 7 |
|---|---|---|---|---|---|---|---|
| Zone 1 | 85.4 | 79.7 | 81.5 | 82.1 | 79.6 | 80.7 | 80 |
| Zone 2 | 300.6 | 305.5 | 302.4 | 304.5 | 304.5 | 312.5 | 308 |
| Zone 3 | 379.6 | 380 | 379.8 | 380 | 379.2 | 381.1 | 380.1 |
| Zone 4 | 379.8 | 379.9 | 380 | 381.8 | 379.9 | 382.2 | 379.9 |
| Zone 5 | 381.7 | 379.6 | 379.2 | 381 | 379.4 | 377.3 | 381.8 |
| Adapter 1 | 450 | 450.4 | 449.6 | 449.6 | 450 | 450.8 | 450.2 |
| Adapter 2 | 451 | 455.6 | 448.1 | 453.1 | 444.7 | 449.2 | 443.7 |
| Adapter 3 | 450.4 | 452.2 | 447.8 | 450.6 | 449.7 | 448.1 | 447.6 |

| | | | |
|---|---|---|---|
| Die temperature 1 (° F.) | 452.6 | Blow up ratio | 2.5 | Die gap (mm) | 2 |
| Die temperature 2 (° F.) | 447.9 | Frost line height | 36 | Nip speed (ft/min) | 49.9 |
| Die temperature 3 (° F.) | 449.5 | Lay flat (inches) | 39.58 | Die diameter (mm) | 250 |
| Die temperature 4 (° F.) | 449.8 | left gusset (inches) | 7.5 | | |
| Die temperature 5 (° F.) | 450.2 | right gusset (inches) | 7.5 | | |
| | | net layflat (inches) | 24.58 | | |

Extrusion Data—Example 2

Extruders 1 and 7 contained 93.5 wt % of resin A, 5 wt % of antiblock master batch, 1.5 wt % of slip master batch and 0.5 wt % of process aid master batch. Extruders 2 through 6 contained 98.5 wt % of inventive polymer, 1 wt % of slip master batch and 0.5 wt % of process aid masterbatch.

|  | Screw speed (RPM) | Load | Melt temperature (° F.) | Melt pressure (psi) | Layer % | Output (lb/hr) |
|---|---|---|---|---|---|---|
| Extruder 1 | 49.7 | 59 | 466.4 | 6310 | 20 | 75 |
| Extruder 2 | 42.3 | 53.9 | 468.8 | 5438 | 12 | 45 |
| Extruder 3 | 43.3 | 54.5 | 477.1 | 5752 | 12 | 45 |
| Extruder 4 | 43 | 54.3 | 457 | 4768 | 12 | 45 |
| Extruder 5 | 45.3 | 51.6 | 458.8 | 4332 | 12 | 45 |
| Extruder 6 | 42.2 | 54.7 | 477.8 | 5544 | 12 | 45 |
| Extruder 7 | 48.8 | 58.8 | 467.3 | 7182 | 20 | 75 |

| Actual Temperature profile (° F.) | Extruder 1 | Extruder 2 | Extruder 3 | Extruder 4 | Extruder 5 | Extruder 6 | Extruder 7 |
|---|---|---|---|---|---|---|---|
| Zone 1 | 86.9 | 80.3 | 80.6 | 80.2 | 80.3 | 81 | 80.1 |
| Zone 2 | 302.9 | 305.2 | 301.7 | 302 | 304.7 | 312.5 | 307.8 |
| Zone 3 | 380.1 | 380.3 | 380.6 | 380 | 380.7 | 381 | 379.8 |
| Zone 4 | 380.4 | 379.7 | 379.5 | 377.9 | 378.7 | 381.9 | 379.8 |
| Zone 5 | 380.7 | 379.6 | 379.9 | 379.6 | 379.1 | 377.8 | 379.8 |
| Adapter 1 | 450.1 | 450.2 | 449.5 | 449 | 449.5 | 451 | 450 |
| Adapter 2 | 447.6 | 445.8 | 447.9 | 448.4 | 458.8 | 447.4 | 457.4 |
| Adapter 3 | 449 | 448.4 | 449.5 | 450 | 450.5 | 449.1 | 452.4 |

| Die temperature 1 (° F.) | 447 | Blow up ratio | 3.5 | Die gap (mm) | 2 |
|---|---|---|---|---|---|
| Die temperature 2 (° F.) | 449.1 | Frost line height | 37 | Nip speed (ft/min) | 35.6 |
| Die temperature 3 (° F.) | 449.2 | Lay flat (inches) | 55.67 | Die diameter (mm) | 250 |
| Die temperature 4 (° F.) | 449.4 | left gusset (inches) | 11.5 | | |
| Die temperature 5 (° F.) | 449.2 | right gusset (inches) | 11.5 | | |
| | | net layflat (inches) | 32.67 | | |

Film physical property data

| Sample | Example 1 | Example 2 |
|---|---|---|
| Film thickness (mil) | 4.0 | 4.0 |
| 20° gloss (%) | 38.4 | 40.4 |
| 45° gloss (%) | 50.6 | 51.3 |
| Haze (%) | 18.2 | 18.0 |
| Avg-PUNCTURE (ft * lbf/in$^3$) | 69.8 | 80.2 |
| static CoF | 0.37 | 0.37 |
| Dynamic CoF | 0.33 | 0.33 |
| Stretch hood hysteresis test 100/75 | | |
| Avg-Elastic Recovery (%) | 46.4 | 47.0 |
| Avg-Permanent Deformation (%) | 53.6 | 53.0 |
| Stretch hood hysteresis test 60/40 | | |
| Avg-Permanent Deformation (%) | 47.1 | 47.0 |
| Avg-Elastic Recovery (%) | 52.9 | 53.0 |
| Avg CD tear (g) | 1859.8 | 1725.9 |
| Avg MD tear (g) | 1275.7 | 1403.3 |
| Dart B (g) | 1500* | 1500* |
| Tensile MD | | |
| Avg-Break Stress (psi) | 6243 | 6383 |
| Avg-Energy Per Volume At Break (ft * lbf/in$^3$) | 1264 | 1294 |
| Avg-Strain at Break (%) | 646 | 666 |
| Avg-Strain at Yield (%) | 14.4 | 15.2 |
| Avg-Stress at Yield (psi) | 1037 | 1024 |
| Tensile CD | | |
| Avg-Break Stress (psi) | 6124 | 6172 |
| Avg-Energy Per Volume At Break (ft * lbf/in$^3$) | 1266 | 1252 |
| Avg-Strain at Break (%) | 690 | 675 |
| Avg-Strain at Yield (%) | 14.1 | 14.2 |
| Avg-Stress at Yield (psi) | 1026 | 1014 |

*Maximum value for Dart B = 1500 g

Puncture and Puncture Modified

Puncture: Puncture is measured on a Instron Model 4201 with Sintech Testworks Software Version 3.10. The specimen size is 6 inch×6 inch and 4 measurements are made to determine an average puncture value. The film is conditioned for 40 hours after film production and at least 24 hours in an ASTM controlled laboratory. A 100 lb load cell is used with a round specimen holder 12.56 square inches. The puncture probe is a ½ inch diameter polished stainless steel ball (on a 0.25 inch rod) with a 7.5 inch maximum travel length. There is no gauge length; the probe is as close as possible to, but not touching, the specimen. The crosshead speed used is 10 inches/minute. The thickness is measured in the middle of the specimen. The thickness of the film, the distance the crosshead traveled, and the peak load are used to determine the puncture by the software. The puncture probe is cleaned using a "Kim-wipe" after each specimen.

Puncture Modified: Same as Puncture Strength except the puncture probe is a 0.5 inch diameter polished stainless steel cylinder resting on a 0.5 inch rod.

We claim:

1. A multi-layer film having a thickness of at least 3 mils comprising at least one inner layer and two exterior layers, wherein the inner layer comprises at least 50 weight percent polyethylene copolymer having a melt index less than 2 grams/10 minutes, a density less than or equal to 0.910 g/cm$^3$, an overall heat of fusion less than 120 Joules/gram and a heat of fusion above 115° C. of less than 5 Joules/gram, and a total heat of fusion of the inner layer less than a heat of fusion of either of the two exterior layers, and wherein the multi-layer film has an elastic recovery of at least 40% when stretched to 100% elongation.

2. The multi-layer film of claim 1 wherein the polyethylene copolymer in the inner layer has a Mw/Mn of at least 2.5.

3. The multi-layer film of claim 1 wherein the polyethylene copolymer of the inner layer is characterized by up to about 3 long chain branches/1000 carbons.

4. The multi-layer film of claim 1 wherein the polyethylene copolymer of the inner layer comprises a single DSC melting peak.

5. The multi-layer film of claim 1 wherein the polyethylene copolymer of the inner layer is characterized by a Comonomer Distribution Constant greater than about 45 and as high as 400, and wherein the polyethylene copolymer has less than 120 total unsaturation unit/1,000,000 C.

6. The multi-layer film of claim 5 wherein the polyethylene copolymer of the inner layer is further characterized as comprising less than 20 vinylidene unsaturation unit/1,000,000 C.

7. The multi-layer film of claim 1, wherein the exterior layers are less than 50 weight percent of the total film.

8. The multi-layer film of claim 1 wherein the film has 3 layers and is made using a blown film process.

9. A stretch hood film structure formed from a film as in claim 1, 7 or 8.

* * * * *